United States Patent
Leone

(10) Patent No.: US 7,857,613 B2
(45) Date of Patent: Dec. 28, 2010

(54) MOLD COOLING BY RECOVERY OF ENERGY FROM SPENT COMPRESSED AIR IN BLOW-MOLDING PROCESS

(75) Inventor: Robert L. Leone, Gray, ME (US)

(73) Assignee: Nestle Waters North America Inc., Greenwich, CT (US)

( * ) Notice: Subject to any disclaimer, the term of this patent is extended or adjusted under 35 U.S.C. 154(b) by 519 days.

(21) Appl. No.: 11/636,328

(22) Filed: Dec. 8, 2006

(65) Prior Publication Data

US 2008/0136068 A1 Jun. 12, 2008

(51) Int. Cl.
B29C 49/64 (2006.01)
B29C 49/28 (2006.01)
B29C 49/08 (2006.01)

(52) U.S. Cl. .................. 425/526; 425/522; 264/523; 264/526; 264/DIG. 50

(58) Field of Classification Search .............. 264/37.16, 264/37.14, 37.17, 526, 528; 425/526
See application file for complete search history.

(56) References Cited

U.S. PATENT DOCUMENTS

| | | | |
|---|---|---|---|
| 3,233,416 A | * | 2/1966 | Rainwater et al. ................. 62/5 |
| 3,993,427 A | * | 11/1976 | Kauffman et al. ........... 425/529 |
| 4,173,447 A | | 11/1979 | Bradbury |
| 4,489,570 A | | 12/1984 | Little |
| 4,838,041 A | | 6/1989 | Bellows et al. |
| 5,285,841 A | | 2/1994 | Yamauchi et al. |
| 5,718,853 A | * | 2/1998 | Ingram ...................... 264/40.1 |
| 5,817,348 A | * | 10/1998 | Ikeda ......................... 425/529 |
| 6,423,253 B1 | * | 7/2002 | Bunel et al. ............... 264/37.16 |
| 7,303,387 B2 | * | 12/2007 | Hutchinson et al. ......... 425/547 |

FOREIGN PATENT DOCUMENTS

| GR | 960100152 | 1/1998 |
|---|---|---|
| WO | WO2005/123357 | 12/2005 |
| WO | WO2007/017429 | 2/2007 |

* cited by examiner

Primary Examiner—Philip C Tucker
Assistant Examiner—William P Bell
(74) Attorney, Agent, or Firm—Ropes & Gray LLP; Jeffrey H. Ingerman

(57) ABSTRACT

Heat is extracted from compressed gas used in a blow-molding process by expansion cooling the exhausted gas and/or passing the exhausted gas through a vortex tube, which supplies cold gas at an exit thereof. The cold gas is then routed through cooling channels in the mold. This obviates the need for recirculating or externally chilling a coolant and saves energy.

15 Claims, 2 Drawing Sheets

MOLD COOLING BY RECOVERY OF ENERGY FROM SPENT COMPRESSED AIR IN BLOW-MOLDING PROCESS

BACKGROUND OF THE INVENTION

The invention relates to cooling of a mold used in a blow-molding process, and more particularly to cooling a mold or sections of a mold by recovering energy from the compressed air or gas used to operate a molding machine and to shape the containers in the mold.

In a typical blow-molding process employed in the manufacture of plastic containers, such as PET (polyethylene terephthalate) bottles, the plastic starting material is heated to about 95° C., which is 20° C. above its glass transition temperature. The supplied heat softens the plastic starting material so it can be stretched to and shaped to fill the mold. Compressed air at a pressure of about 30 bar and a temperature between about 20° C. and 30° C. is blown in the interior of a preform of the container, urging the container against the walls of the mold. The container hereby takes on the shape of the mold cavity.

Before the blow-molded container is removed from the mold, the mold is cooled to below the glass transition temperature of the plastic material, i.e., below about 70° C. for PET. In current molding machines, the mold is cooled by flowing chilled water at about 12° C. through cooling channels arranged in or on the mold. The water is chilled in a closed-loop refrigeration system and pumped through insulated pipes systems to the blow mold, where it flows through the cooling channels. During the molding process, the water temperature rises by about 2° C. The water is then returned from the mold to the refrigeration system to remove heat.

Water-cooled systems are subject to scale buildup and corrosion, are expensive to maintain and require a supply of external energy to chill the water, while the energy contained in the compressed gas used in the blow-molding process is wasted, as the compressed gas is simply vented to the ambient environment.

It would therefore be desirable to provide a system and method for cooling a blow-molding machine using less energy.

SUMMARY OF THE INVENTION

The present invention provides a system and method for cooling a blow-molding machine using less energy. The invention also achieves the result of recovering otherwise-wasted energy from the compressed gas used for blowing the mold and operating the machine. The recovered energy is used for cooling the mold.

According to one aspect of the invention, a cooling arrangement for a mold of a blow molding machine includes an expansion cooler having a high pressure side and a low pressure side, wherein the high pressure side receives pressurized gas at a first temperature used for molding an article in the blow molding machine, and a cooling channel disposed in the mold and receiving gas from the low pressure side of the expansion cooler at a second temperature lower than the first temperature. The gas at the second temperature flows through the cooling channel and cooling the mold.

According to another aspect of the invention, a method for cooling a mold of a blow-molding apparatus includes the steps of exhausting gas at a first temperature from a pressurized compartment of the blow-molding apparatus through an expansion cooler to provide a flow of gas at a second temperature lower than the first temperature, and directing the gas flow at the second temperature through a cooling channel in a mold to cool the mold.

Advantageous embodiments may include one or more of the following features. The cooling arrangement may include a manifold configured to supply the pressurized gas to an interior volume of the article to be molded and to exhaust the pressurized gas from the molded article to the high pressure side of the expansion cooler. The expansion cooler may have a Venturi constriction.

In one embodiment, at least one vortex tube may be placed between the low pressure side of the expansion cooler and the cooling channel. The vortex tube has an inlet port configured to receive the gas from the low pressure side of the expansion cooler and a cold outlet port in fluid communication with the cooling channel. Cold gas from the cold outlet port passes through a cooling channel in the mold and cools the mold. More than one vortex tube may be employed, as the mold may include several mold sections with separate cooling channels. The different vortex tubes can be connected to different cooling channels in the various mold sections.

In one embodiment, a reservoir may be disposed upstream of the at least one first vortex tube, with the reservoir having a pressure intermediate between the pressure of the pressurized gas and the pressure at the outlet port of the vortex tube or tubes. The intermediate pressure is preferably constant, independent of a mold cycle of the blow molding machine.

The blow-molding apparatus may include one or more actuators, which may be pneumatically operated, for connecting a blow nozzle to the mold neck and operating a stretching rod for stretching a preform of the article. Gas exhausted for the actuator(s) and/or from any other pressurized section of the molding apparatus may be routed through another vortex tube, which may then also supply cold gas to the cooling channels. Preferably, the pressurized gas exhausted from at least the actuator and the pressurized gas exhausted from the pressurized molded article are the only sources of energy cooling the mold.

Cyclic operation of the blow-molding apparatus can be timed by a timing circuit configured to operate the various valves, manifolds, actuators, etc. Additional energy can be recovered from the hot outlet ports of the various vortex tubes, with the hot gas to be used, for example, for raising or maintaining a temperature of the preform or heating the mold body to control container shrinkage.

The article to be molded can be made of a plastic material, and the gas temperature at the cold gas outlet port of the vortex tubes may advantageously be adjusted to be below the glass transition temperature of the plastic material.

Further features and advantages of the present invention will be apparent from the following description of exemplary embodiments and from the claims.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention is directed to systems and methods that efficiently cool a mold at the conclusion of the molding process to facilitate removal of a dimensionally stable container from the mold. In particular, the systems and methods described herein can recover energy from the compressed gas employed in the blow-molding process. The recovered energy is used for cooling the mold, thereby saving energy compared to conventional cooling methods that employ recirculating chilled water cooling.

Figure 1:
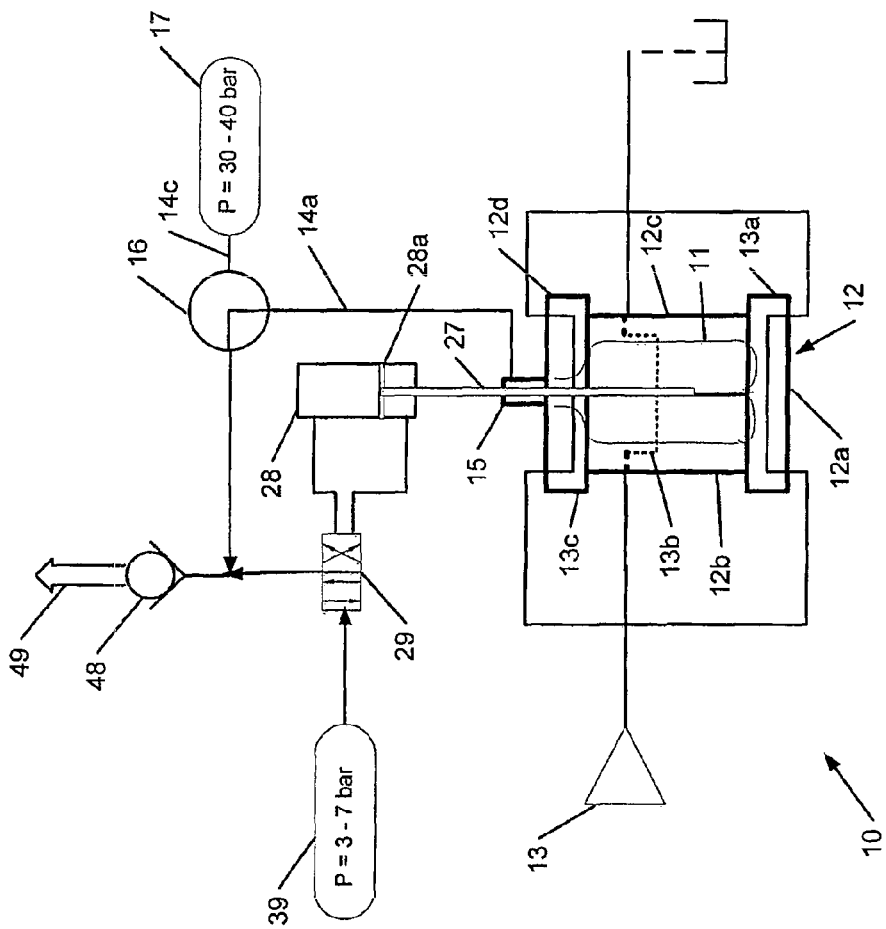
FIG. 1 shows a conventional system for cooling a blow mold.

FIG. 1 shows schematically a conventional blow molding system 10, which includes a mold 12 with a mold bottom 12a, side sections 12b, 12c, and a mold neck 12d. The mold bottom 12a, side sections 12b, 12c, and mold neck 12d may be separable to facilitate un-molding a finished container 11. Although the mold 12 is shown as having two side sections 12a, 12b, it will be understood that the mold 12 may have only one side section or more than two side sections. Cooling channels 13a, 13b, 13c for cooling the mold 12 pass through the mold sections 12a, 12b, 12c and 12d.

In a blow-molding process, a container is formed by heating a preform (a small tube of plastic with the cap threads pre-molded into the plastic) made, for example, of PET to about 95° C., for example, in an infrared oven. At this temperature the plastic becomes soft. The heated preform (not shown) is then placed inside the mold 12, and a blow nozzle 15 is lowered by an actuator, such as the illustrated exemplary pneumatically operated linear actuator 28, or by a cam (not shown), sealing against the preform in the mold. The actuator 28 or cam in the illustrated embodiment is operated by compressed gas 39 having a pressure of between about 3 bar and about 7 bar. The gas is supplied to a respective chamber of actuator 28 via a 4-port valve 29 to move a piston 28a. Air from the other unpressurized chamber is exhausted to atmosphere 49 through a check valve 48.

Once the preform is sealed inside the mold, a stretch rod 27 is lowered at a specific mechanical rate, for example, with the same actuator 28 or with a different actuator (not shown), thereby stretching the preform to at least partially fill the mold cavity.

Compressed air from exemplary air supply 17 is introduced through line 14c, a three-way valve 16, line 14a and blow nozzle 15 into the interior of the preform, first at a relatively low pressure (between about 6 and about 15 bar), to evenly distribute the plastic inside the mold. The three-way valve may be cam- or solenoid-operated, or energized by any suitable actuator known in the art. Once the preform is fully stretched, the gas pressure is increased to between about 30 bar and about 40 bar to urge the preform against the interior surface(s) of the mold and achieve definition. Compression of the gas causes the gas inside the preform to heat up. As the expanded preform touches the mold cavity, thermal energy from the hot gas inside the preheated preform is transferred to the mold 12.

After the container is formed, the actuator 28 raises the connected stretch rod 27 out of the newly formed container, the cam operated three-way valve or solenoid valve 16 opens and the container is exhausted to atmosphere 49. The blow nozzle 15 is raised by either a cam or a pneumatic actuator and the newly formed container is removed from the mold. The energy stored in the pressurized gas is essentially wasted in a conventional blow-molding machine.

Before the finished container 11 can be removed from the mold 12, the mold 12 needs to be cooled below the glass transition temperature of the plastic container material. This is achieved by continuously flowing a coolant 13 through the cooling channels 13a, 13b, 13c, possibly during the entire molding cycle, and not only when the container is removed from the mold. The coolant also needs to be chilled which requires additional energy.

A typical blow-molding machine can manufacture containers at a rate of 18 to 30 containers per minute per mold, depending on the machine capacity. In the following example, a container size of 1 liter is assumed, although the system can operate with other container sizes. The heat transferred to the mold is proportional to the gas volume and hence to the internal volume of the produced container, i.e., smaller containers transfer less heat to the mold which then requires less cooling.

The compressed air used to form a 1 liter container is at a pressure of 30 to 40 bar (435-580 psi). Assuming that between about 18 and about 30 containers are manufactured per minute and per mold, this represents between about 18 and about 30 liters of compressed air per minute per mold cavity at between about 30 bar and about 40 bar of pressure, or between about 0.6 $m^3$/min and about 1.0 $m^3$/min for a 34-cavity machine at that pressure. Additional compressed air at an operating pressure of about 7 bar is used by the actuator that operates the stretching cylinders 27 and the blow nozzle 15 and from other pressurized sections of the machine. This additional volume is between about 1.5 $m^3$ and about 2 $m^3$ for the 34-cavity machine at that operating pressure. The entire air volume contained in the actuator(s) or cam(s) that move the blow nozzle and stretch rod, as well as the valve actuators, can be used for cooling the mold in accordance with the method of the invention.

Figure 2:
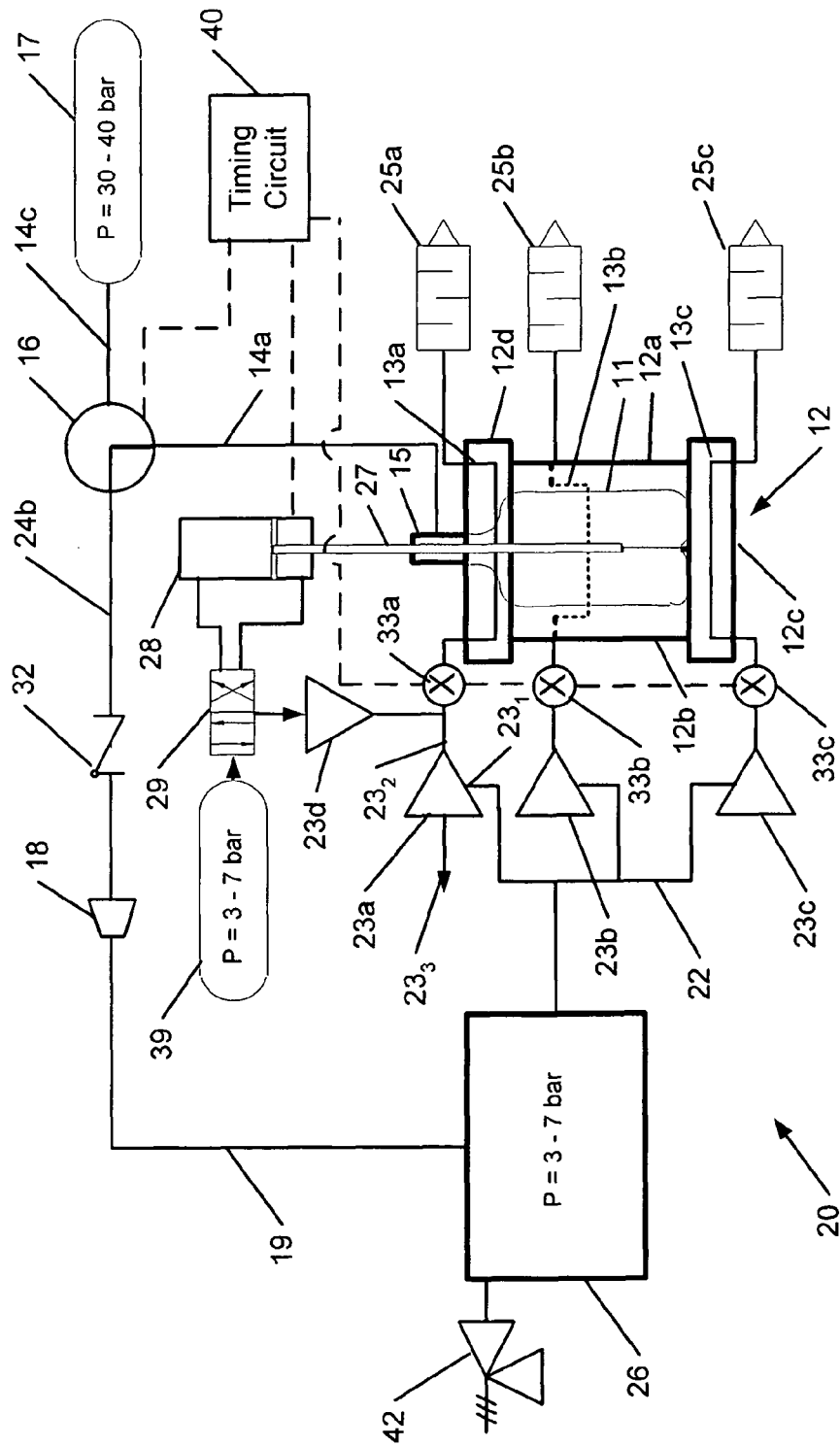
FIG. 2 shows a system according to the invention for cooling a blow mold.

FIG. 2 shows schematically an exemplary blow-molding system 20 according to the invention which, unlike the conventional system of FIG. 1, recovers the energy from the compressed gas to cool the mold 12 or at least parts of the mold 12, such as the mold neck 12d. The mold 12 of system 20 is substantially identical to mold 12 of system 10 depicted in FIG. 1 and includes mold bottom 12a, mold sections 12b, 12c, and mold neck 12d. Cooling channels 13a, 13b, 13c for cooling the mold extend inside the various mold sections 12a, 12, 12c, 12d.

As before, actuator 28, which may be implemented as a cam, may, for example, be pneumatically driven from compressed gas source 39 having a pressure of between about_3 bar and about 7 bar. Stretch rod 27 preferably is lowered by actuator 28 to stretch the preform inside mold 12, whereafter the container preform may be pressurized to between about 30 bar and about 40 bar from compressed gas source 17 via 3-way valve 16 and gas line 14a connected to blow nozzle 15, to urge the preform against the interior surface(s) of the mold and achieve definition. However, instead of being vented to atmosphere at the conclusion of each molding cycle, as in the conventional system 10, the pressurized gas remaining inside the finished container flows through gas line 14a and 3-way valve 16 and line 24b and further through a check valve 32 and a direct expansion diffuser (e.g., a Venturi jet) 18 to a gas reservoir 26. Alternatively, it may be possible to use a vortex tube, as described below, instead of the expansion diffuser 18 to cool the pressurized gas. The gas reservoir 26 may be maintained at a pressure of, for example, between about 3 bar and about 7 bar. The temperature of the gas in reservoir 26 after expansion can be below ambient temperature, for example, at a temperature between about 10° C. and about 20° C., depending on the operating conditions, such as flow rate and pressure.

While the gas flow through lines 14a, 24b before expansion diffuser 28 is typically intermittent—for example, between about 18 times and about 30 times per minute for synchronously operating mold cavities—reservoir 26 may "buffer" those pressure fluctuations so that the pressure in reservoir 26 remains substantially constant. Any excess pressure is preferably vented via a safety relief valve 42 which may be located on the reservoir 26.

Reservoir 26 is connected via a manifold 22 to the high-pressure side of one or more vortex tubes 23a, 23b, 23c. A vortex tube, such as exemplary vortex tube 23a, has an inlet port 231 (typically a side port) for the compressed gas, an outlet port 232 located at one end of the vortex tube and delivering an adjustable volume fraction of cooled gas (also referred to as cold end), and another outlet port 233 located at the opposite end of the vortex tube for delivering a complementary volume fraction of the hot gas heated in the vortex tube (also referred to as hot end). The volume fraction and the temperature of gas released from the cold end 232 of a vortex tube can be adjusted by adjusting the percentage of input compressed gas released through the cold end of the tube, which percentage may be referred to as the "cold fraction." The cold fraction is also a function of the type of vortex tube in the vortex tube—i.e., the vortex tube can be designed as a "high cold fraction" generator or as a "low cold fraction" generator. A vortex tube with a low cold fraction, i.e. with a smaller volume percentage of the total gas input exiting at the cold end of the vortex tube, will typically result in a lower temperature of the gas at the cold end.

The vortex tubes 23a, 23b, 23c reduce the temperature of a portion of the gas supplied from the reservoir 26 to the respective inlet ports of the vortex tubes 23a, 23b, 23c and exiting at the cold ends. The vortex tubes 23a, 23b, 23c preferably are sized to accommodate the total flow of between about 0.6 m³/min and 1.0 m³/min of the compressed gas exhausted from the finished molded containers.

The gas exiting the cold end of vortex tubes 23a, 23b, 23c preferably flows through the connected cooling channels 13a, 13b, 13c disposed in mold sections 12a, 12b, 12c, 12d. In the vortex tubes 23a, 23b, 23c, the gas pressure drops from between about 3 bar and about 7 bar in reservoir 26 to about 1 bar at the respective cold-fraction ports. Valves 33a, 33b, 33c may be connected between the vortex tubes 23a, 23b, 23c and the respective flow channels 13a, 13b, 13c, or at any other suitable location in the gas flow passageways for connecting and/or adjusting the flow of the cold gas. The vortex tubes 23a, 23b, 23c preferably are sized to match the total flow rate through cooling channels in the individual mold cavities.

If the mold is cast (e.g., in the case of an aluminum mold), the cooling channels in the mold may be formed as small passageways during casting. Alternatively, or in addition, the cooling channels can be drilled into the mold sections in, for example, a simple cross drill pattern. After flowing through the passageways 13a, 13b, 13c and absorbing heat from the mold (sections), the gas used to cool the mold is preferably exhausted through baffles 25a, 25b, 25c to reduce noise. It has been demonstrated that the temperature of air entering a vortex tube at a pressure of about 1.5 bar and with a flow rate of about 0.3 m³/min can be lowered by about 28° K. This chilled air may pass through the mold cooling channels and remove the heat generated by the blow-molding process, preferably without requiring additional cooling power.

Additional energy can be recovered from the compressed gas operating the actuator 28, the stretching cylinder 27 and the blow nozzle 15, which has about the same pressure as the gas in reservoir 39. This gas can also be directed through an additional vortex tube 23d to provide an additional flow of cold gas at the cold end of additional vortex tube 23d. The outlet of vortex tube 23d can be connected to any one of cooling channels 13a, 13b, 13c or to a combination of these cooling channels. It will be understood that throughput of vortex tubes 23a, 23b, 23c, 23d should be appropriately matched to the capacity of cooling channels 13a, 13b, 13c.

A timing circuit 40, which may already be part of a conventional molding system, may be connected to the various valves 16, 33a, 33b, 33c, and the actuator 28 to properly time insertion of the preform into the mold, pressurization of the preform and depressurization of the molded article, and removal of the molded article from the mold.

The hot gas exiting the vortex tube 23a at the hot end 233 can be directed through a heat exchanger (not shown) to preheat the preforms before these enter a preheat oven or while the preheated preforms are transported from the preheat oven to the blow wheel, thereby recovering additional energy.

Excess recovered cold air (not shown) can be used to cool the neck barrier of the container in the oven to prevent distortion of the threaded neck finish, again using the cold end of a vortex tube for supplying the cooled air.

In summary, methods and systems have been described that use the thermal energy of compressed gas from pressurized sections of a blow-mold to cool the mold when removing the molded articles. The process saves energy which would otherwise have to be expended for chilling a coolant, for example, cooling water or a gas.

While the invention has been disclosed in connection with the preferred embodiments shown and described in detail, various modifications and improvements thereon will become readily apparent to those skilled in the art. For example, the vortex tubes and direct expansion diffusers may be used in combination or their role may be interchanged. One skilled in the art will appreciate that the present invention can be practiced by other than the described embodiments, which are presented for purposes of illustration and not of limitation, and the present invention is limited only by the claims which follow.

What is claimed is:

1. A cooling arrangement for a mold of a blow molding machine, comprising:
    an expansion cooler having a high pressure side and a low pressure side, said high pressure side receiving pressurized blowing gas used for molding an article in the blow molding machine and having a first temperature; and
    a cooling channel disposed in the mold and receiving cooled blowing gas from the low pressure side of the expansion cooler at a second temperature lower than the first temperature, said cooled blowing gas at the second temperature flowing through the cooling channel and cooling the mold.

2. The cooling arrangement of claim 1, further comprising a manifold configured to supply the pressurized blowing gas to an interior volume of the article to be molded and to exhaust the pressurized blowing gas from the molded article to the high pressure side of the expansion cooler.

3. The cooling arrangement of claim 1, wherein the expansion cooler comprises a Venturi constriction.

4. The cooling arrangement of claim 1, further comprising at least one first vortex tube interposed between the low pressure side of the expansion cooler and the cooling channel and having an inlet port configured to receive the cooled blowing gas from the low pressure side of the expansion cooler, and a cold outlet port in fluid communication with the cooling channel.

5. The cooling arrangement of claim 4, further comprising a reservoir disposed upstream of the at least one first vortex tube, said reservoir having a pressure intermediate between a pressure of the pressurized gas and a pressure at the outlet port of the at least one first vortex tube.

6. The cooling arrangement of claim 5, wherein said intermediate pressure is substantially constant independent of a mold cycle of the blow molding machine.

7. The cooling arrangement of claim 6, wherein:
the mold includes a plurality of mold sections, each respective mold section having dedicated cooling channels;
the cooling arrangement comprises a plurality of first vortex tubes; and
each of the plurality of first vortex tubes is connected to cooling channels of a respective one of the mold sections.

8. The cooling arrangement of claim 4, wherein the first vortex tube comprises a hot outlet port supplying heated gas for heating a preform of the article to be molded.

9. The cooling arrangement of claim 1, wherein the blow molding machine comprises an actuator configured to operate at least one of a blow nozzle for connecting the pressurized gas to an interior volume of an article to be molded and a stretching rod for expanding a preform of the article to be molded.

10. The cooling arrangement of claim 9, wherein the actuator is a pneumatic actuator.

11. The cooling arrangement of claim 10, wherein:
the actuator is operated by pressurized actuating gas; the cooling arrangement further comprising:
a second vortex tube having an inlet port configured to receive the pressurized actuating gas exhausted from at least the actuator at the end of the mold cycle, and a cold outlet port in fluid communication with a cooling channel of the mold for cooling the mold.

12. The cooling arrangement of claim 11, wherein the pressurized actuating gas exhausted from at least the actuator and the pressurized gas exhausted from the pressurized molded article are substantially the only sources of energy cooling the mold.

13. The cooling arrangement of claim 9, wherein the actuator is a cam.

14. The cooling arrangement of claim 1, further comprising a timing circuit defining a mold cycle of the blow molding machine.

15. The cooling arrangement of claim 1, wherein:
the article to be molded is made of a plastic material having a glass transition temperature; and
the second temperature is lower than the glass transition temperature of the plastic material.

* * * * *